United States Patent
Grant

(10) Patent No.: US 8,781,011 B2
(45) Date of Patent: Jul. 15, 2014

(54) RECEIVER PARAMETRIC COVARIANCE ESTIMATION FOR PRECODED MIMO TRANSMISSIONS

(75) Inventor: Stephen J. Grant, Cary, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1179 days.

(21) Appl. No.: 12/036,323

(22) Filed: Feb. 25, 2008

(65) Prior Publication Data

US 2009/0213944 A1 Aug. 27, 2009

(51) Int. Cl.
H04B 7/02 (2006.01)
H04L 1/02 (2006.01)

(52) U.S. Cl.
USPC .......................... 375/267; 375/316; 375/346

(58) Field of Classification Search
USPC .................. 375/260, 267, 316, 346
See application file for complete search history.

(56) References Cited

U.S. PATENT DOCUMENTS

| 6,005,887 | A | 12/1999 | Bottomley et al. |
| 2001/0028677 | A1 | 10/2001 | Wang et al. |
| 2003/0031234 | A1 | 2/2003 | Smee et al. |
| 2005/0111528 | A1 | 5/2005 | Fulghum et al. |
| 2005/0195889 | A1 | 9/2005 | Grant et al. |
| 2005/0201447 | A1 | 9/2005 | Cairns et al. |
| 2006/0256843 | A1* | 11/2006 | Grant et al. .................. 375/148 |
| 2007/0047628 | A1 | 3/2007 | Fulghum et al. |
| 2008/0152053 | A1 | 6/2008 | Fulghum et al. |

FOREIGN PATENT DOCUMENTS

| CN | 101048949 A | 10/2007 |
| WO | 2005096517 A1 | 10/2005 |
| WO | 2006037593 A1 | 4/2006 |
| WO | 2006/132593 A2 | 12/2006 |
| WO | 2008/076053 A2 | 6/2008 |

OTHER PUBLICATIONS

Grant et al., "Generalized RAKE Receivers for MIMO Systems," IEEE Vehicular Technology Conference, Orlando, FL, US, Oct. 6-9, 2003, pp. 424-428, vol. 1, IEEE, Piscataway, NJ, US.
3rd Generation Partnership Project. 3GPP TS 25.214, V8.3.0 (Sep. 2008). 3rd Generation Partnership Project; Technical Specification Group Radio Access Network; Physical layer procedures (FDD) (Release 8). Sep. 2008.

(Continued)

Primary Examiner — Chieh M Fan
Assistant Examiner — Freshteh N Aghdam
(74) Attorney, Agent, or Firm — Coats and Bennett, P.L.L.C.

(57) ABSTRACT

A model-based technique for estimating signal impairments that can accommodate various transmitted signal configurations, including closed-loop transmit diversity signals and pre-coded MIMO signals, is disclosed. In an exemplary method, an impairment model is constructed for a received composite information signal comprising at least a first data stream transmitted from first and second antennas according to a first antenna weighting vector. The impairment model includes one or more model terms scaled by corresponding scaling parameters, wherein the model terms capture propagation channel effects and are independent of the first antenna weighting vector, and wherein the scaling parameters capture effects of the first antenna weighting vector. A parametric estimate of the impairment covariance is calculated using the impairment model.

23 Claims, 7 Drawing Sheets

(56) References Cited

OTHER PUBLICATIONS

3rd Generation Partnership Project. 3GPP TS 25.101, V8.4.0 (Sep. 2008). 3rd Generation Partnership Project; Technical Specification Group Radio Access Network; User Equipment (UE) radio transmission and reception (FDD) (Release 8). Sep. 2008.

Jonsson, E. et al. "Receiver Parametric Covariance Estimation for Transmit Diversity." Co-pending U.S. Appl. No. 11/751,109, filed May 21, 2007.

Bottomley, G. E. et al. "A Generalized RAKE Receiver for Interference Suppression." IEEE Journal on Selected Areas in Communications, vol. 18, No. 8, Aug. 2000, pp. 1536-1545.

* cited by examiner

RECEIVER PARAMETRIC COVARIANCE ESTIMATION FOR PRECODED MIMO TRANSMISSIONS

FIELD OF THE INVENTION

The present invention relates generally to wireless communication systems, and in particular to a parametric system and method for covariance estimation in a wireless communication system employing precoded multiple-input multiple-output (MIMO) transmissions.

BACKGROUND

Spread-spectrum communication systems are well known in the art and widely deployed. A class of receivers well suited for use in spread-spectrum systems—such as those standardized in IS-95, IS-2000 (cdma2000), and the $3^{rd}$-Generation Partnership Project's (3GPP) Wideband Code-Division Multiple Access (W-CDMA) specifications—is the linear interference-whitening (LIW) receiver. LIW receivers suppress interference in addition to collecting signal energy for detection. One form of the LIW receiver is a transversal chip equalizer; another is a G-Rake receiver. The Rake receiver derives its name from its rake-like structure, wherein multiple receiver "fingers" are used to receive multiple signal images in a received multipath signal. By coherently combining the finger outputs in a weighted Rake combiner, the conventional Rake receiver can use multipath reception to improve the Signal to Interference-plus-Noise Ratio (SINR) of the received signal. A Generalized Rake (G-Rake) receiver improves interference suppression performance over a conventional Rake receiver using more sophisticated generation of the combining weights.

Recently, 2×2 Multiple-Input Multiple-Output (MIMO) technology has been standardized in Release 7 of the 3GPP specifications. The standardized scheme, referred to as Dual-Transmit Adaptive Arrays (D-TxAA), is similar to selective per-antenna rate control (S-PARC), except that adaptive unitary precoding is applied to each of the data streams, in this case to each of one or two High-Speed Downlink Shared Channel (HS-DSCH) data streams.

D-TxAA can be viewed as an extension of the previously standardized closed-loop mode-1 (CL-1) transmit diversity scheme, in that the precoding vectors (which map a data stream to the multiple transmit antennas) used for each of the D-TxAA data streams are selected from the same codebook used for CL-1. In contrast to CL-1, however, D-TxAA includes two modes of operation—single-stream mode and dual-stream mode. In single-stream mode, one of the four possible precoding vectors from the CL-1 codebook is applied to a single data stream. In dual-stream mode, orthogonal pairs of precoding vectors (again selected from the CL-1 codebook) are applied to the two data streams. The use of precoding has a significant impact on the receiver, and in particular complicates the design of LIW receivers such as Rake receivers.

Earlier versions of the 3GPP W-CDMA specifications (i.e., prior to Release 7) define two transmit diversity modes: CL-1, and an open-loop mode known as STTD. U.S. patent application Ser. No. 10/800,167 (Pub. No. US 2005/0201447), titled "Method and Apparatus for Parameter Estimation in a Generalized Rake Receiver," filed Mar. 12, 2004 by Cairns et al. (the "Cairns application"), assigned to the assignee of the present application and incorporated herein by reference in its entirety, discloses a solution for G-Rake receivers in a transmit diversity system. The solution describes a parametric approach to estimating an impairment covariance matrix used to form G-Rake combining weights. The parametric approach estimates the impairment covariance as a sum of terms, including a separate term for each transmit antenna as well as a term corresponding to the sum of noise plus other-cell interference.

This solution works well for open-loop transmit diversity modes. In an open-loop mode, the impairments corresponding to each transmit antenna during a particular symbol period are uncorrelated, since different symbols are transmitted from the different antennas. In closed-loop mode, however, the mobile terminal specifies a phase offset, and the same symbol is transmitted by a primary antenna and simultaneously by a secondary antenna with the specified phase offset. In this case, the impairment due to each transmit antenna is highly correlated. This correlation may be exploited to improve interference suppression and receiver performance. U.S. patent application Ser. No. 11/751,109, titled "Receiver Parametric Covariance Estimation for Transmit Diversity," filed May 21, 2007 by Jonsson et al. (the "Jonsson application"), assigned to the assignee of the present application and incorporated herein by reference in its entirety, discloses a parametric approach to estimating an impairment covariance matrix that accounts for the simultaneous transmission of the same symbols from a first and second antenna. In this approach the impairment covariance matrix for a system employing two transmit antennas is formulated as a sum of seven terms, including a term corresponding to each of the transmit antennas, a noise-plus-other-cell-interference term, plus four additional terms corresponding to the four possible precoding vectors in the CL-1 codebook. The terms are weighted by fitting parameters determined by fitting the parametrically modeled impairment covariance to a measured impairment covariance. An implicit assumption is that if one or more of the preceding vectors are not used by any user in the cell, then the corresponding fitting parameter will ideally be estimated as zero.

The CL-1 covariance estimation approach described in the Jonsson application applies to the transmission of only a single data stream, mapped according to a preceding vector to two (or more) antennas. In contrast, in D-TxAA, two data streams may be transmitted simultaneously, with both data streams sharing the same set of channelization codes. This creates additional self-interference, referred to as code-reuse interference, which affects the formulation of the impairment covariance. Code reuse is not accounted for in the formulation of Jonsson, since only one data stream is ever transmitted in CL-1.

Furthermore, in the solution described by Jonsson, an impairment term corresponding to each of the four possible preceding vectors in the CL-1 codebook is computed, since the receiver typically has no knowledge of which precoding vectors (except its own) are utilized by the transmitter. As mentioned above, if one or more of the preceding vectors is not actually utilized by at least one other same-cell user, then the fitting parameter corresponding to that term should ideally be estimated as zero. In this case, then, the impairment term is unnecessarily constructed. Because construction of the impairment terms is computationally demanding, any unnecessary construction of one or more impairment terms is undesirable. A related issue in a situation where one or more of the precoding vectors are not utilized is that the impairment covariance matrix is over-modeled, which may potentially lead to well-known problems with fitting parameter estimation and resulting poor performance.

SUMMARY

The present invention provides methods and apparatus to estimate signal impairment covariances for one or more received signals of interest using a model-based technique that can accommodate various transmitted signal configurations, including closed-loop transmit diversity signals and pre-coded MIMO signals. According to one or more embodiments described and claimed herein, a parametric form of G-Rake and chip equalization is provided that accounts for impairment correlation between Rake fingers or equalizer taps. In an exemplary method, an impairment model is constructed for a received composite information signal comprising at least a first data stream transmitted from first and second antennas according to a first antenna weighting vector. The impairment model includes one or more model terms scaled by corresponding scaling parameters, wherein the model terms capture propagation channel effects and are independent of the first antenna weighting vector, and wherein the scaling parameters capture effects of the first antenna weighting vector. A parametric estimate of the impairment covariance is calculated using the impairment model.

Another embodiment relates to a wireless communication receiver for use in a mobile terminal in a transmit diversity wireless communication system. The receiver includes a radio front-end circuit configured to provide a received signal of interest containing at least a first data stream transmitted simultaneously from a first and second antenna according to a first antenna weighting vector. The receiver circuit is configured to carry out one or more of the methods described herein for estimating impairment covariance.

DETAILED DESCRIPTION

Figure 1:
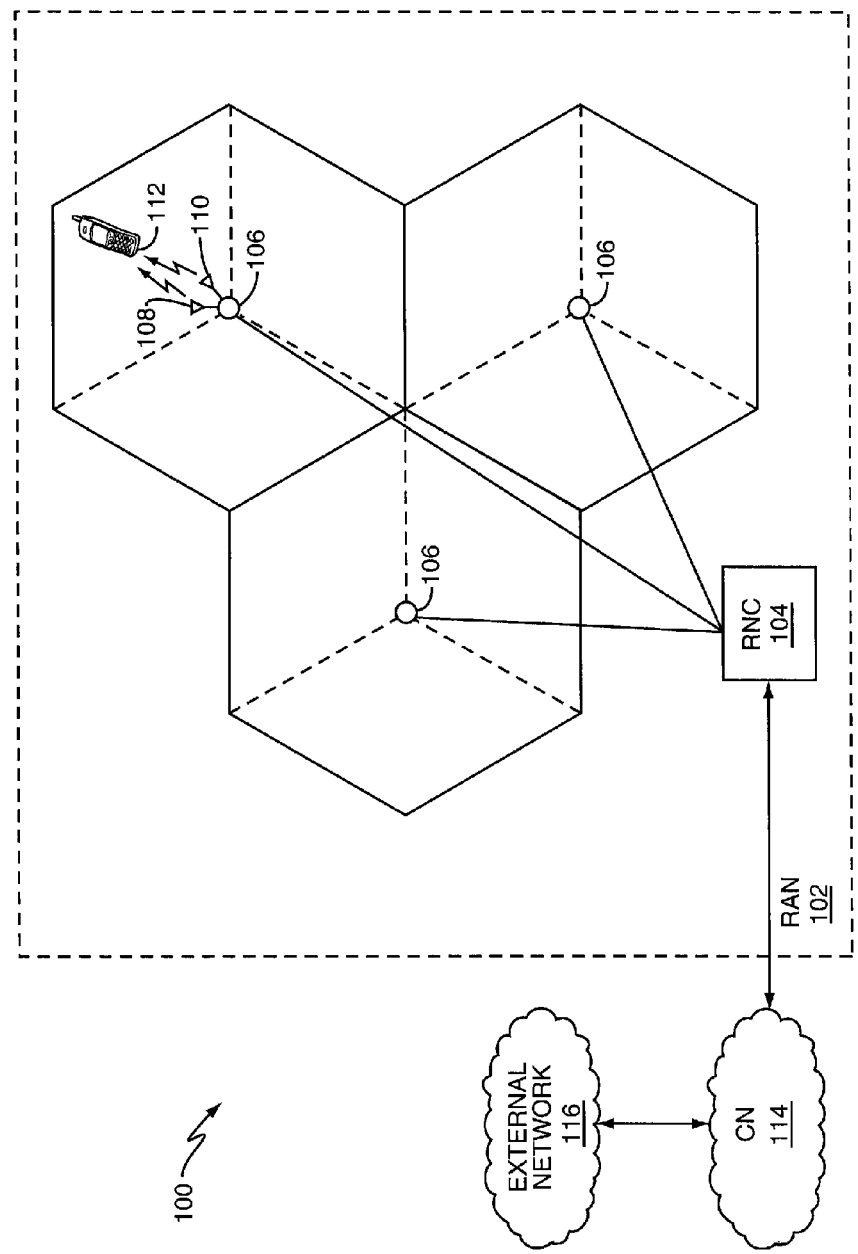
FIG. 1 is a functional block diagram of a wireless communication system.

FIG. 1 depicts an exemplary wireless communication system 100 employing closed-loop transmit diversity, such as CL-1, and/or multiple-input multiple-output (MIMO) transmissions, such as according to the D-TxAA specifications. Within a Radio Access Network (RAN) 102, a Radio Network Controller (RNC) 104 controls a plurality of base transceiver stations (BTS) 106, also known in the art as Node B's. Each Node B 106 provides radio communication services with subscriber mobile terminals 112 within a geographic area called a cell, which may be divided into sectors, as depicted in FIG. 1. The RNC 104 communicates with a Core Network (CN) 114, which in turn is connected to one or more external networks 116, such as the Public Switched Telephone Network (PSTN), the Internet, or the like.

Embodiments of the present invention are described herein with respect to WCDMA standards, including the CL-1 specifications and specifications for D-TxAA, which is more fully described below. However, the invention is not so limited, and the inventive concepts disclosed and claimed herein may be advantageously applied to a wide array of transmit diversity systems.

Figure 2:
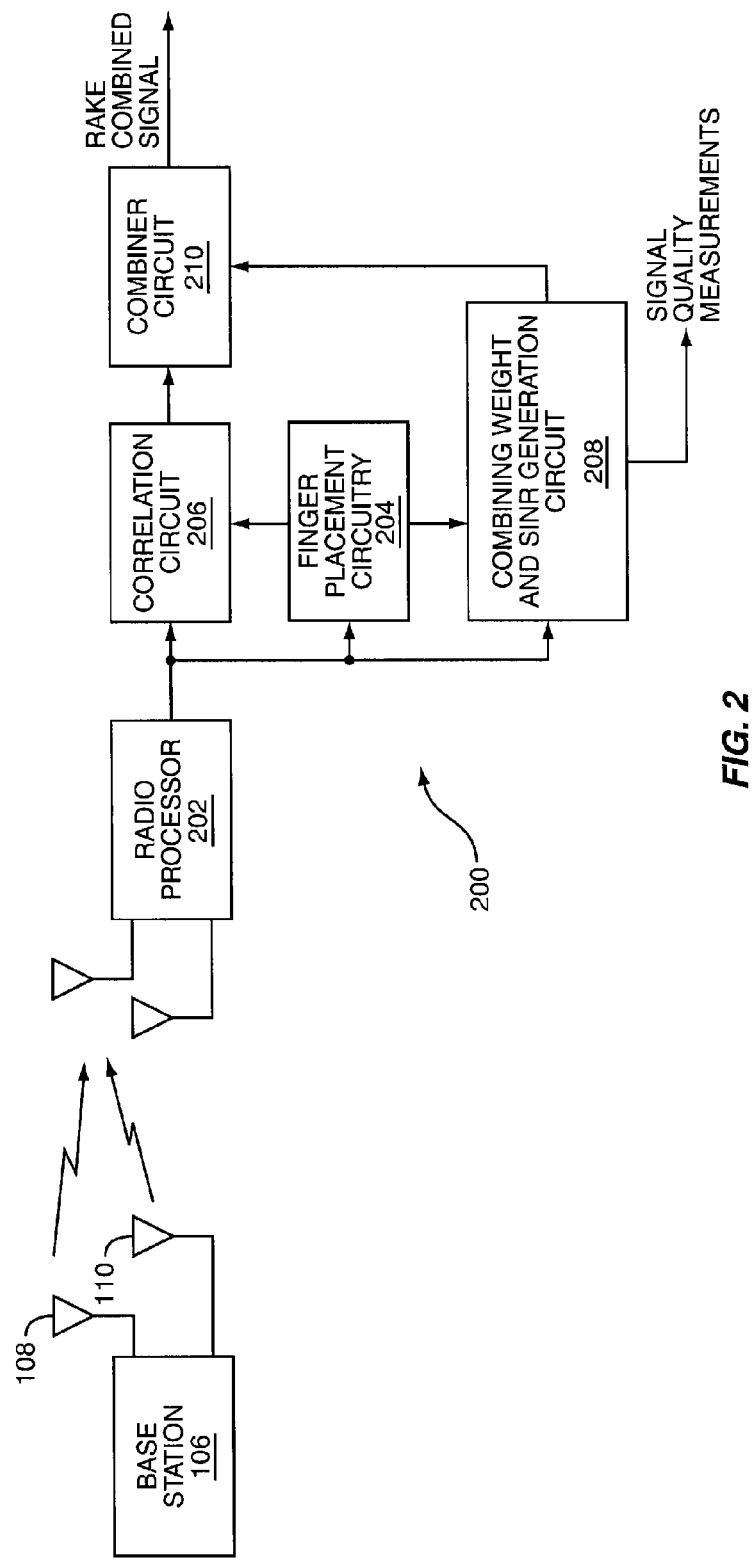
FIG. 2 is a functional block diagram of an exemplary symbol-level LIW receiver configured to process received signals transmitted from at least first and second transmit antennas.

Each base station 106 includes at least a primary transmit antenna 108 and a secondary transmit antenna 110 (either per-cell or per-sector, depending on the network 100 configuration), as shown in FIG. 2. The base station 106 may transmit an information signal, such as a precoded voice signal or a precoded High-Speed Downlink Packet Access (HSDPA) data signal using both antennas 108, 110. The signal transmitted on the secondary antenna 110 is weighted relative to the signal transmitted on the primary antenna 108, wherein the transmit weights may comprise phase offset only, or may more generally comprise a complex quantity having both phase and amplitude. The phase shift employed may be determined by feedback from the mobile terminal 112, thus forming a closed-loop transmit diversity system.

As one non-limiting example, in the WCDMA standard known as CL-1, the relative phases ($\theta_i$) of the secondary antenna are 45, 135, 225, or 315 degrees, or $$\theta_i = \pi\left(-\frac{1}{4} + \frac{i}{2}\right)$$

for i=1, 2, 3, 4 in radians. In general, the two transmit antennas can have different filters applied, which can introduce different phase, amplitude, and delay characteristics. Usually single-tap filters are employed with a common delay, so that the two transmit antennas are characterized by different complex antenna weight values.

In addition to an information signal, the base station transmits a pilot channel from each transmit antenna 108, 110. The pilot channels comprise a series of pilot symbols. In some embodiments, the primary transmit antenna 108 transmits a sequence of QPSK pilot symbols $s_p(k)$ using a linked-256 Walsh code that is scrambled by a specific long code. In the WCDMA standard, the pilot symbols take on the same value $s_p(k)=(1+j)/\sqrt{2}$. The sample may be treated as purely real or purely imaginary, as described in U.S. Pat. No. 6,005,887, DESPREADING OF DIRECT SEQUENCE SPREAD SPECTRUM COMMUNICATIONS SIGNALS, issued Dec. 21, 1999 to Bottomley, et al., assigned to the assignee of the present application, and incorporated herein by reference in its entirety. For the secondary transmit antenna 110, the same Walsh code and the same scrambling code are used. However, the pilot symbol values are modified by a sequence $M_k$ such that $M_k s_p(k)$ is sent. For example, the sequence $M_k$ in slot 0 of every frame is given by {$M_k$;k=1,10}=+1,-1,-1,+1,+1,-1,-1,+1,+1,-1.

Thus, over the duration of each two symbol periods (512 chips), the pilot signals from the primary antenna 108 and the secondary antenna 110 are orthogonal. This can be viewed as two pilot channels using supersymbols of length 512 (referred to as nonoverlapping symbol periods). By contrast, each set of 256 chips corresponds to an overlapping pilot symbol period.

In general, the base station power allocated to the pilots on the primary and secondary antennas could be different. To reflect this, the power allocation parameters $\gamma_p(0)$ and $\gamma_p(1)$ are introduced. These quantities take values between 0 and 1 that represent the fraction of the total pilot power allocated to the pilots on the primary and secondary antenna, respectively. For the special case of equal pilot power allocation, $\gamma_p(0)=\gamma_p(1)=0.5$.

There are two main types of LIW receiver architectures. One uses symbol-level equalization, which is typically based on maximum likelihood estimation techniques. This type of receiver includes the G-Rake receiver 200, illustrated in block diagram form in FIG. 2. A radio processor 202 generates chip samples from a received signal, which includes the information signal transmitted from antennas 108 and 110 at base station 106. The chip samples are provided to a finger placement circuit 204, which determines the "finger delays," usually including multipath delays, used to despread a received CDMA signal in a correlation unit 206. The finger delays are also provided to a weight computer 208 that computes combining weights which are used to combine the despread values in a combiner 210 to produce soft values, or estimates of the symbol values.

Figure 3:
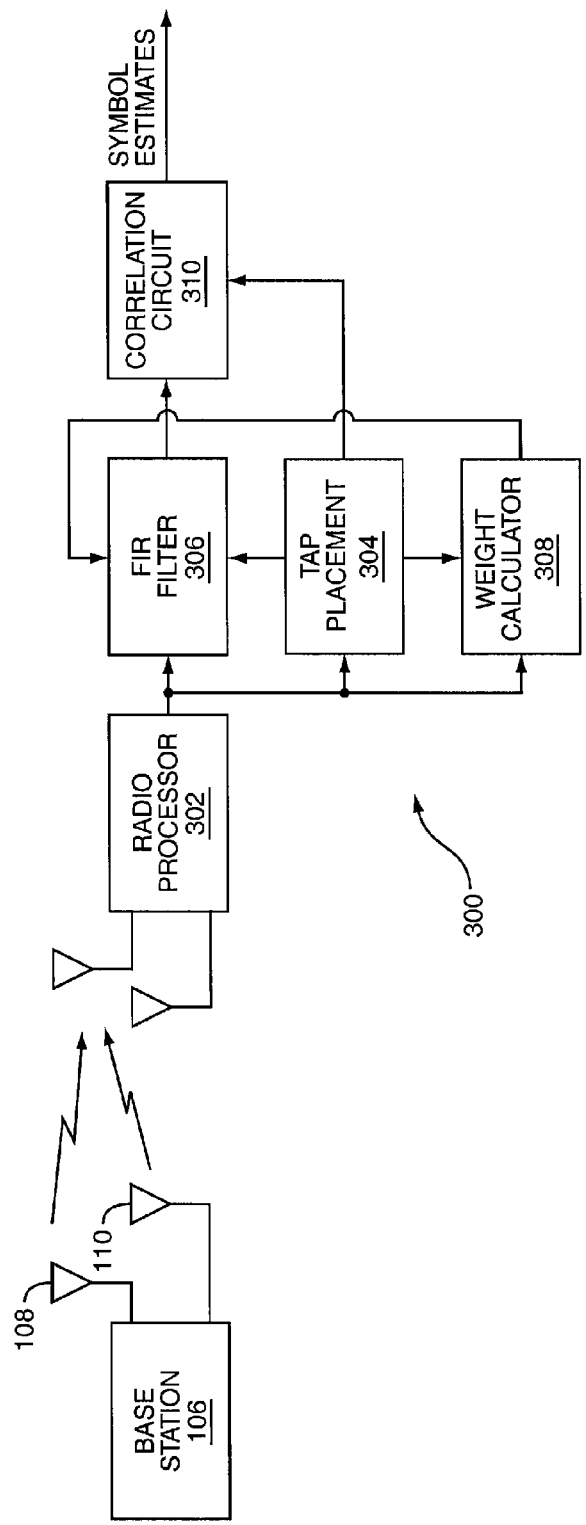
FIG. 3 is a functional block diagram of an exemplary chip-level LIW receiver configured to process received signals transmitted from at least first and second transmit antennas.

Another type of LIW receiver is a chip-level equalizer, which typically includes Minimum Mean-Square Error (MMSE) transversal chip equalization 300, as illustrated in block diagram form in FIG. 3. A radio processor 302 generates chip samples from a received signal. The chip samples are provided to a tap placement circuit 304, which determines the tap delays, related to multipath delays, for a Finite Impulse Response (FIR) filter 306. The selected tap delays are also provided to a weight calculator 308 that computes filter coefficients (or weights) for the FIR filter 306. The FIR filter 306 filters the chip samples to produce a signal that is despread by a correlator 310 to produce symbol estimates.

Both types of LIW receivers 200, 300 rely on an estimate of a covariance matrix. In the case of maximum likelihood G-Rake processing, the covariance matrix is an impairment covariance matrix. In the case of MMSE-based processing, a data covariance matrix, which is closely related to the impairment covariance matrix, is used. According to embodiments described herein, an impairment model is constructed, the impairment model generally including several model terms scaled by corresponding scaling parameters. As will be shown below, the model terms may be constructed so that each is independent of antenna weighting vectors (precoding vectors) used for transmitting the information signals. Effects of the antenna weighting vectors are captured by the scaling parameters. The scaling parameters may be calculated, in some embodiments, or may be jointly estimated ("fitted") according to well-known techniques by fitting the impairment model to measured impairment covariance or data covariance. For convenience, this process is described with respect to a G-Rake receiver and an impairment covariance matrix. However, the use of a data covariance matrix in the case of a chip equalizer is directly analogous.

Figure 4:
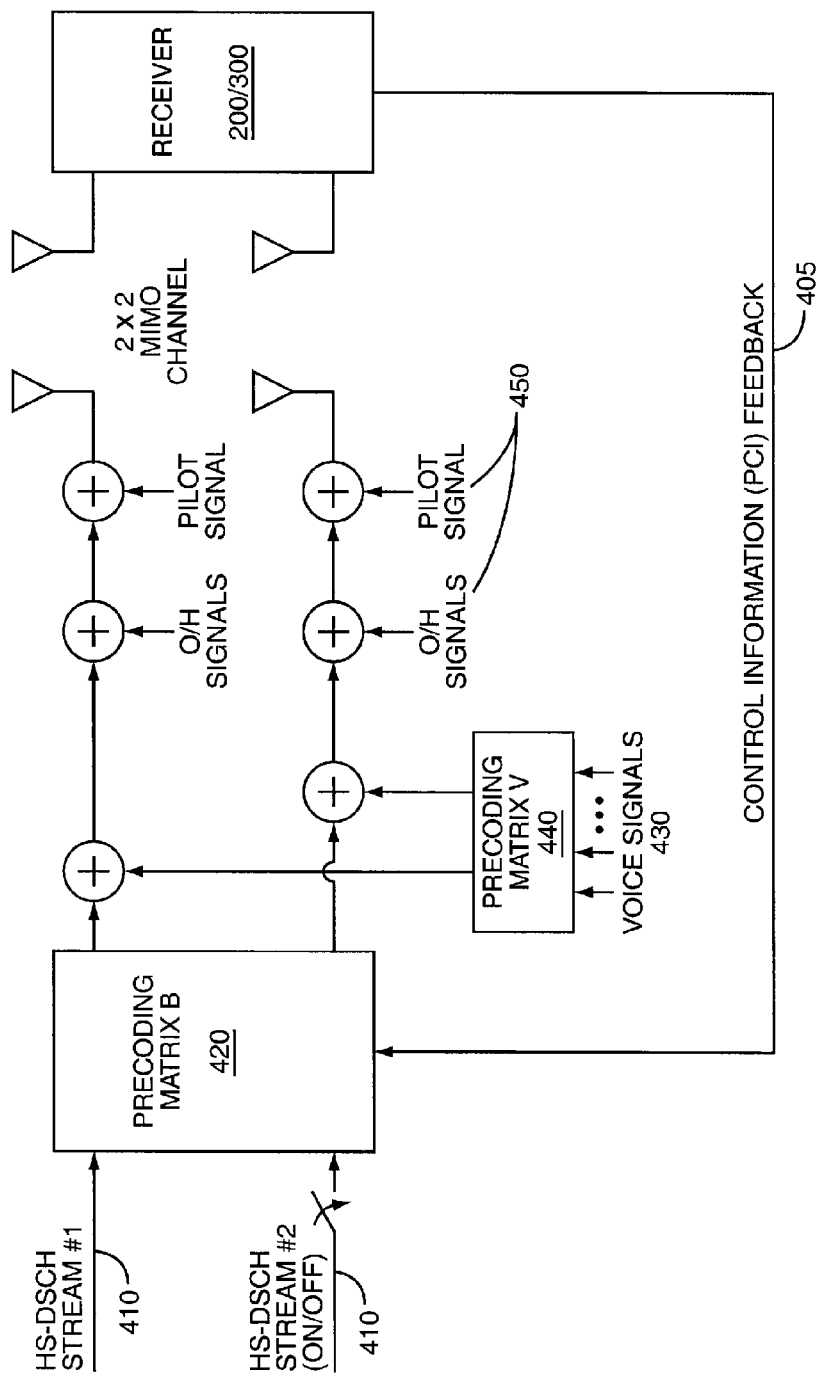
FIG. 4 is a block diagram illustrating the composition of a transmitted signal.

In order to provide context for a detailed discussion of impairment models, additional background of the D-TxAA MIMO scheme standardized by 3GPP in Release-7 High-Speed Packet Access (HSPA) specifications is provided here. A high-level view of the scheme is shown in FIG. 4. In Release-6 (non-MIMO) HSPA, the theoretical maximum downlink data rate is 14.4 Mbps which is achieved using 15 codes, 16-QAM, and coding rate 1. With D-TxAA, this peak rate may doubled to 28.8 Mbps by transmitting a second, separately encoded data stream in parallel, when channel conditions warrant. Typically, this occurs at high signal-to-noise ratios (SNRs) and when the channel is full rank. In rank-deficient scenarios and/or lower SNRs, the second data stream may be switched off, as indicated in the figure, so that only a single data HSPA data stream is transmitted.

D-TxAA uses a form of unitary precoding applied to the HS-DSCH data streams using the precoding weight matrix B. The weight vectors (columns of B) applied to each stream are drawn from the same codebook of four phase-only weights used for the closed-loop mode-1 (CL-1) transmit diversity option defined in Rel-99:

$$u_i = \frac{1}{\sqrt{2}}\begin{bmatrix} 1 \\ e^{j\frac{\pi}{4}(2i-1)} \end{bmatrix}, \quad i=1,2,3,4. \quad (1)$$

Those skilled in the art will appreciate that while phase-only weights are used in D-TxAA as currently standardized, MIMO transmission more generally may use amplitude weighting as well. Further, the codebook from which the weight vectors are drawn is by no means limited to four entries.

In any event, for the case of single-stream D-TxAA transmission, the weight vector is a single one of the four possible vectors in the CL-1 codebook. For the case of dual-stream transmission, the two used weight vectors are selected to be orthogonal; hence, B is unitary. With respect to the CL-1 codebook as defined in Equation (1), the orthogonal pairings are thus (1,3) and (2,4) and permutations thereof.

With this structure, there are fundamentally eight different transmitter modes corresponding to the different choices for B and the different modes—4 single-stream modes and 4 dual-stream modes. The single-stream modes are defined by $$B \in \{[u_1\, 0],[u_2\, 0],[u_3\, 0],[u_4\, 0]\} \quad (2)$$

and the dual-stream modes by $$B \in \{[u_1\, u_3],[u_2\, u_4],[u_3\, u_1],[u_4\, u_2]\}. \quad (3)$$

A selection of the "best" transmitter mode is made by the user equipment (UE) through maximizing some metric such as data rate, SINR, received power per-stream, or the like. The UE indicates its preferred precoding configuration through feedback, called preceding control information (PCI), transmitted to the Node B on the high-speed dedicated physical control channel (HS-DPCCH), as shown in FIG. 4. The PCI feedback 405 informs the scheduler in the Node B of the preferred number of data streams and the preferred preceding weight vector(s). The Node B signals the actually used preceding matrix B, as well as the actually transmitted number of streams, on the downlink high-speed shared control channel (HS-SCCH). This information is used to configure the receiver in the UE.

As can be seen in FIG. 4, a number of different signals form the composite transmitted signal on each antenna. These include the following: the one or two high-speed downlink shared channel (HS-DSCH) data streams 410 which are precoded, using matrix B, at block 420; a number of dedicated channel signals (e.g., voice and/or control), including voice signals 430, which may be configured using CL-1 transmit diversity using the matrix V at block 440; and a number of other overhead signals 450 (e.g., pilots, voice, control, etc.) that are not precoded. The precoding matrix V is given by $$V=[v_1\, v_2 \ldots v_{K_v}], \quad (4)$$

where $K_v$ is the number of dedicated channels configured in CL-1 transmit diversity. Each preceding vector (column of V) is given by one of the 4 possible vectors in the CL-1 codebook.

It is important to note that when the transmitter is configured in dual-stream mode, the same set of channelization (spreading) codes is used for both streams. This creates self-interference that must be resolved by the receiver. In other words, when the receiver demodulates each stream, it must suppress interference from the other stream.

Various embodiments of the present invention exploit a new way of expressing the covariance term associated with a given precoded signal. This approach allows the receiver to more readily take into account an arbitrary precoding configuration for the various signals, while reducing complexity compared to previous solutions and avoiding over-modeling problems.

Consider any one of the transmitted signals (HS-DSCH or dedicated channel signal) transmitted according to an arbitrary preceding vector denoted $u=[u_1\ u_2]^T$. The "effective" medium channel response corresponding to the preceding vector u may be given as:

$$\hat{g}^{eff} = u_1\hat{g}_1 + \sqrt{\frac{\gamma_p(1)}{\gamma_p(2)}}\, u_2\hat{g}_2, \quad (5)$$

where $\hat{g}_1$ is the channel estimate (medium response) associated with transmit antenna 1 (Tx1), $\hat{g}_2$ is the channel estimate (medium response) associated with transmit antenna 2 (Tx2), $\gamma_p(1)$ is the fraction of the total pilot power allocated to antenna 1 (a value between 0 and 1), and $\gamma_p(2)$ is the fraction of the total pilot power allocated to antenna 2 (also a value between 0 and 1).

Next, an impairment term associated with a transmit signal utilizing the preceding vector u may be denoted $R(\hat{g}^{eff})$. The functional form of $R(\hat{g}^{eff})$ was given in the Cairns and Jonsson applications discussed above, and depends on the pulse shape autocorrelation function as well as the medium response channel estimates. Elements in this matrix correspond to pairs of fingers. For example, for finger $f_1$ (associated with delay $d_{f_1}$ and receive antenna $l_1$) and for finger $f_2$ (associated with delay $d_{f_2}$ and receive antenna $l_2$), the corresponding matrix element is given by $$r(f_1, f_2) = \sum_{p_1=0}^{P-1}\sum_{p_2=0}^{P-1} \hat{g}^{eff}(p_1,l_1)\bigl(\hat{g}^{eff}(p_2,l_2)\bigr)^* \cdot \sum_{\substack{k=-\infty \\ k \neq 0}}^{\infty} x(d_{f_1}-\tau_{p_1}-kT_c)x^*(d_{f_2}-\tau_{p_2}-kT_c) \quad (6)$$

where P is the number of paths, $\hat{g}^{eff}(p,l)$ is the effective medium response channel coefficient corresponding to the preceding vector u that is associated with receive antenna 1 and path delay $\tau_p$, $x(\tau)$ is the chip pulse shape autocorrelation function, and $T_c$ is the chip period.

In the Jonsson application, a covariance term $R(\hat{g}^{eff})$ is constructed for each of the four entries in the CL-1 codebook, i.e., $u=u_i$ for i=1, 2, 3, 4. Disclosed here is a new form for the impairment term that is generated as follows. First, substituting Equation (5) into Equation (6) yields the following alternative form for $r(f_1, f_2)$:

$$r(f_1, f_2) = |u_1|^2 r_{11}(f_1, f_2) + |u_2|^2\left(\frac{\gamma_p(1)}{\gamma_p(2)}\right) r_{22}(f_1, f_2) + \mathrm{Re}[u_1 u_2^*]\sqrt{\frac{\gamma_p(1)}{\gamma_p(2)}}\, r_{12}^+(f_1, f_2) + j\mathrm{Im}[u_1 u_2^*]\sqrt{\frac{\gamma_p(1)}{\gamma_p(2)}}\, r_{12}^-(f_1, f_2) \quad (7)$$

where $$r_{12}^+(f_1,f_2) = r_{12}(f_1,f_2) + r^*_{12}(f_2,f_1)$$

$$r_{12}^-(f_1,f_2) = r_{12}(f_1,f_2) - r^*_{12}(f_2,f_1) \quad (8)$$

Letting $m_1$ and $m_2$ each index either transmit antenna 1 or 2, the covariance term $r_{m_1 m_2}(f_1,f_2)$ appearing in Equations (7) and (8) corresponds to the $(m_1,m_2)^{th}$ pair of Tx antennas, and is given by:

$$r_{m_1 m_2}(f_1, f_2) = \sum_{p_1=0}^{P-1}\sum_{p_2=0}^{P-1} \hat{g}_{m_1}(p_1,l_1)\hat{g}^*_{m_2}(p_2,l_2) \cdot \sum_{\substack{k=-\infty \\ k \neq 0}}^{\infty} x(d_{f_1}-\tau_{p_1}-kT_c)x^*(d_{f_2}-\tau_{p_2}-kT_c), \quad (9)$$

where $\hat{g}_{m_1}(p_1,l_1)$ is the channel estimate (medium response) associated with transmit antenna $m_1$, receive antenna $l_1$ and path delay $\tau_{p_1}$, and $\hat{g}_{m_2}(p_2,l_2)$ is the channel estimate (medium response) associated with transmit antenna $m_2$, receive antenna $l_2$ and path delay $\tau_{p_2}$.

Equations (7) and (8) thus provide covariance terms corresponding to the three transmit antenna pairs (1,1), (2,2), and (1,2). Those skilled in the art will notice that $r_{11}(f_1,f_2)$ and $r_{22}(f_1,f_2)$ are each a function of the propagation channel estimates associated with only a single transmit antenna (Tx1 and Tx2, respectively). In contrast, $r_{12}(f_1,f_2)$ is a function of the channel estimates associated with both transmit antennas.

In what follows, the full matrix consisting of the elements $r_{m_1 m_2}(f_1,f_2)$ for all fingers $f_1$ and $f_2$ is denoted $R_{m_1 m_2}$. Using this notation, along with Equations (7) and (8), a new form for the impairment term $R(\hat{g}^{eff})$ is given by:

$$R(\hat{g}^{eff}) = |u_1|^2 R_{11} + |u_2|^2\left(\frac{\gamma_p(1)}{\gamma_p(2)}\right) R_{22} + \mathrm{Re}[u_1 u_2^*]\sqrt{\frac{\gamma_p(1)}{\gamma_p(2)}}\, R_{12}^+ + j\mathrm{Im}[u_1 u_2^*]\sqrt{\frac{\gamma_p(1)}{\gamma_p(2)}}\, R_{12}^-, \quad (10)$$

where $$R_{12}^+ = R_{12} + R_{12}^H$$

$$R_{12}^- = R_{12} - R_{12}^H \quad (11)$$

and $R_2^H$ denotes the Hermitian transpose of the matrix $R_{12}$.

Accordingly, rather than constructing the impairment term $R(\hat{g}^{eff})$ for $u=u_i$ for i=1, 2, 3, 4 using Equation (6), as is shown in the Jonsson reference, instead the three fundamental matrix terms $R_{11}$, $R_{22}$, and $R_{12}$ are constructed using Equation (9). This operation only needs to be done once (for a given set of channel conditions), since the three fundamental terms are not a function of the preceding weights. In other words, the three impairment terms given in Equation (10) are independent of the preceding vector weights.

In order to build an overall impairment covariance matrix which includes contributions from all transmitted signals, it is only necessary to scale and combine these three fundamental terms (comparatively simple operations) in different ways for each constituent transmit signal. Thus, the same impairment model terms may be used for any preceding scenario. The scaling/combining takes into account the precoding vector and power allocation associated with each individual signal.

Accordingly, a new parametric form for the overall impairment covariance matrix associated with a composite transmitted signal is given by:

$$R = \alpha_1 R_{11} + \alpha_2 R_{22} + \alpha_{12}^+ R_{12}^+ + j\alpha_{12}^- R_{12}^- + \beta R_N, \quad (12)$$

where $R_N$ is an impairment term modeling noise plus other-cell interference. The associated scaling parameter $\beta$ captures the energy of this impairment.

If first and second HS-DSCH data streams are precoded according to $b_1 = [b_{11}\ b_{21}]^T$ and $b_2 = [b_{12}\ b_{22}]^T$, respectively, and the precoding vector applied to the $k^{th}$ of K voice signals is denoted $v_k = [v_{1k}\ v_{2k}]^T$, then the other four scaling parameters in Equation (12) are given by:

$$\alpha_1 = \frac{1}{(\gamma_p(1)N_p)}\left[\Gamma_{D/P}(\gamma_d(1)|b_{11}|^2 + \gamma_d(2)|b_{12}|^2) + \Gamma_{V/P}\sum_{k=1}^{K_v}\gamma_v(k)|v_{1k}|^2 + \gamma_o(1)\Gamma_{O/P} + \gamma_p(1)\right] \quad (13)$$

$$\alpha_2 = \frac{1}{\gamma_p(2)N_p}\left[\Gamma_{D/P}(\gamma_d(1)|b_{21}|^2 + \gamma_d(2)|b_{22}|^2) + \Gamma_{V/P}\sum_{k=1}^{K_v}\gamma_v(k)|v_{2k}|^2 + \gamma_o(2)\Gamma_{O/P} + \gamma_p(2)\right]$$

$$\alpha_{12}^+ = \frac{1}{N_p\sqrt{\gamma_p(1)\gamma_p(2)}}\left[\Gamma_{D/P}(\gamma_d(1)\operatorname{Re}[b_{11}b_{21}^*] + \gamma_d(2)\operatorname{Re}[b_{12}b_{22}^*]) + \Gamma_{V/P}\sum_{k=1}^{K_v}\gamma_v(k)\operatorname{Re}[v_{1k}v_{2k}^*]\right]$$

$$\alpha_{12}^- = \frac{1}{N_p\sqrt{\gamma_p(1)\gamma_p(2)}}\left[\Gamma_{D/P}(\gamma_d(1)\operatorname{Im}[b_{11}b_{21}^*] + \gamma_d(2)\operatorname{Im}[b_{12}b_{22}^*]) + \Gamma_{V/P}\sum_{k=1}^{K_v}\gamma_v(k)\operatorname{Im}[v_{1k}v_{2k}^*]\right]$$

where $N_p$ represents the spreading factor used for the pilot signals (typically 256), $\Gamma_{x/P}$ is the ratio of the total power allocated to signal type-x to the total power allocated to the pilot signals on both transmit antennas (x=D for HS-DSCH data, x=V for voice signals and x=O for overhead signals), and $\gamma_x(k)$ denotes the fraction of the type-x power allocated to each user/antenna for pilot signals (x=p), voice signals (x=v), and overhead signals (x=o). For the case of the data signals (x=d), $\gamma_d(k)$ represents the allocation of data power between streams; thus, $\gamma_d(1)=1$ and $\gamma_d(2)=0$ for single-stream transmission. Typically, $\gamma_d(1)=\gamma_d(2)=0.5$ for dual-stream transmission, i.e., energy associated with the data is evenly split between the two streams.

Those skilled in the art will appreciate that the preceding configuration of the transmitter is wholly reflected by the scaling parameters $\alpha_1$, $\alpha_2$, $\alpha_{12}^+$, and $\alpha_{12}^-$ in the above formulation. This means that when the preceding configuration changes, e.g., the transmitter switches between single and dual stream transmission, or when the preceding vectors used by different voice users changes, only the parameter values change. The overall structure of the receiver in terms of number of impairment terms does not change. Regardless of the actual signal configuration, the fundamental matrix terms $R_{11}, R_{22}, R_{12}$, and $R_N$ may be constructed in the same manner. ($R_{12}^+$, and $R_{12}^-$ are easily computed from $R_{12}$). Then, the five corresponding scaling parameters $\alpha_1$, $\alpha_2$, $\alpha_{12}^+$, $\alpha_{12}^-$, and $\beta$ may be estimated according to known techniques (e.g., according to the techniques described in the Cairns application discussed above). This same procedure may be used regardless of the precoding configuration. Thus, the receiver structure is "blind" to the actual preceding used by various signals. The scaling parameter estimates will automatically capture whatever impairment color exists. Those skilled in the art will appreciate that fewer parameters are estimated, and fewer matrices constructed, compared to the approach described in the Cairns application.

An exemplary method 500 of estimating impairment covariance associated with a received composite information signal, in which the model described above may be used, is thus depicted in FIG. 5. The described method is particularly applicable for processing received signals that include at least one component transmitted from two or more antennas according to a precoding vector. However, those skilled in the art will appreciate that the method accommodates non-precoded signals as well. These latter signals are accommodated by the theory underpinning the described impairment model by simply regarding these signals as being associated with antenna weighting vectors of $[1,0]^T$ or $[0,1]^T$.

Method 500 begins at block 510, with the computation of first and second impairment model terms, corresponding to first and second transmit antennas respectively. These terms, $R_{11}$, and $R_{22}$, are functions of propagation channel estimates (typically, medium channel response estimates) associated with the respective antennas, and further depend on the chip pulse shape autocorrelation function. The elements of $R_{11}$, and $R_{22}$ may be calculated according to Equation (9); details for performing calculations of this general form, including techniques for handling the infinite summation of Equation (9), are well-known, and are given in the Cairns and Jonsson applications discussed above.

At block 520, a third impairment model term, $R_{12}$, is computed, based on the propagation channel estimates associated with both transmit antennas. The elements of $R_{12}$ may also be computed according to Equation (9). Once $R_{12}$ is calculated, it may be readily decomposed into components $R_{12}^+$, and $R_{12}^-$ according to Equation (11).

Similarly, a noise term, $R_N$, which represents noise and other-cell interference, may be calculated, as shown at block 530, according to techniques that are well-known, such as are described in the Cairns and Jonsson applications.

At block 540, impairment covariance or data covariance is measured, to provide a rough estimate, or "snapshot" of signal impairments. Those skilled in the art will appreciate that whether impairment covariance or data covariance is measured will depend on the receiver implementation. Typically, a G-Rake receiver is configured to perform impairment covariance measurements using pilot channel data. Measured data covariance can be obtained by summing outer products of several sample data vectors (vector elements corresponding to finger outputs), i.e.:

$$\tilde{R}_{meas} = \sum_m y(m)y^H(m), \quad (14)$$

where m is a time index.

At block 550, "instantaneous" values for the parameters that scale the impairment model terms are determined. Those skilled in the art will appreciate that several of the quantities in Equation (13) are likely to be unknown. However, values for the scaling parameters may be estimated by fitting the weighted sum of model terms to the measured covariance (or data covariance, although in this case the fitting equation must include an additional term corresponding to the outer product of the net channel response). A least-squares or other fitting approach may be used, treating equations with complex quantities as two real-value equations, as is well known in the art. Once instantaneous values for the scaling parameters have been determined, they may additionally be smoothed, or filtered, over successive estimates of the scaling parameters values, to reduce estimation noise.

Once values for the scaling parameters have been determined, then they may be applied to the parametric covariance model terms to generate an impairment covariance estimate, as shown at block 560. If $\hat{\alpha}_1$, $\hat{\alpha}_2$, $\hat{\alpha}_{12}^+$, $\hat{\alpha}_{12}^-$ and $\hat{\beta}$ represent the fitted (and optionally smoothed) scaling parameter values, then the estimated impairment covariance is given by:

$$\hat{R}_u = \hat{\alpha}_1 R_{11} + \hat{\alpha}_2 R_{22} + \hat{\alpha}_{12}^+ R_{12}^+ + j\hat{\alpha}_{12}^- R_{12}^- + \hat{\beta} R_N. \tag{15}$$

The estimated covariance may be used, for example, for generating combining weights for signal detection, to estimate channel quality (e.g., to estimate or predict signal-to-noise-plus-interference or other channel quality metric), and so on, as shown at block 570. Periodically, such as at every WCDMA timeslot, the process may be repeated, as shown at block 580, to dynamically adapt the covariance estimate to changing channel conditions and interference profiles.

Figure 5:
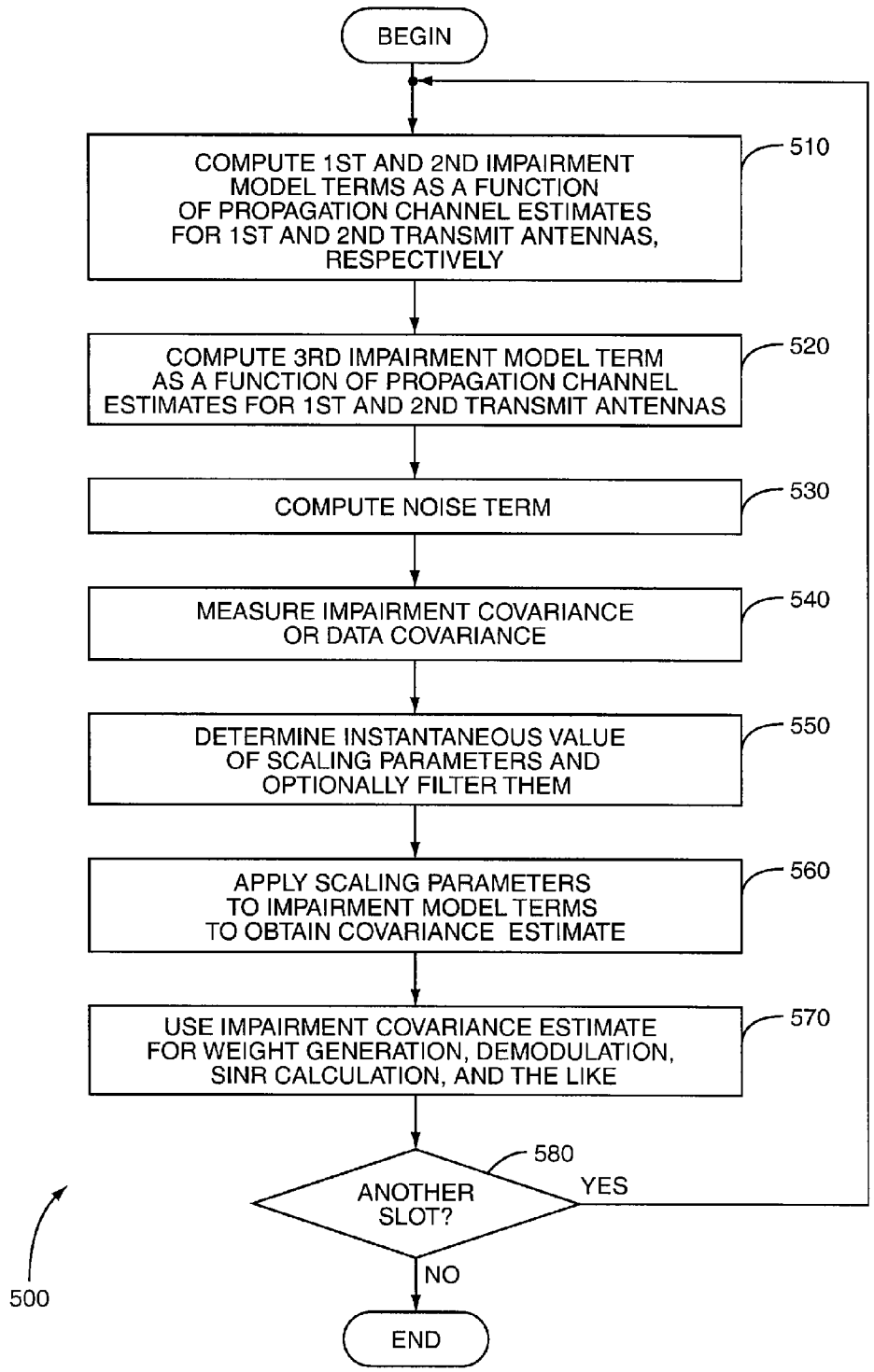
FIG. 5 is a flow diagram of an exemplary method of estimating impairment covariance of a received signal of interest.

As mentioned above, the estimated impairment covariance produced by the method of FIG. 5 may be used for, among other things, producing processing weights, such as combining weights for fingers of a G-RAKE receiver. The combining weights used for detecting a particular signal depend on whether one or two streams are being transmitted. For single-stream mode, the combining weights $w^{single}$ may be obtained by solving the system of equations:

$$\hat{R}_u w^{single} = h_{eff}(b), \tag{16}$$

where $h_{eff}(b)$ indicates the "effective" net channel coefficients that depend on the preceding vector b, and is given by:

$$h_{eff}(b) = b_1 h_1 + b_2 \sqrt{\frac{\gamma_p(1)}{\gamma_p(2)}} h_2, \tag{17}$$

where $h_m$ is the net channel response associated with the $m^{th}$ transmit antenna (m=1 or 2) and $b_1, b_2$ are the elements of b. Elements of the net response vector $h_m$ correspond to a given finger. For example, for finger f (associated with delay $d_f$ and receive antenna l), the corresponding vector element is given by:

$$h_m(f) = \sum_{p=0}^{P-1} \hat{g}_m(p, l)x(d_f - \tau_p), \tag{18}$$

where P is the number of paths, $\hat{g}_m(p,l)$ is the channel estimate (medium response) associated with transmit antenna m, receive antenna l and path delay $\tau_p$, and $x(\tau)$ is the chip pulse shape autocorrelation function. (Those skilled in the art will appreciate that b here is the first column of B as described above for single stream mode. Those skilled in the art will also appreciate that the same approach applies to signals transmitted from a single antenna, in that b in this case equals $[1,0]^T$ or $[0,1]^T$.)

In dual-stream mode, on the other hand, two data streams are transmitted simultaneously, both sharing the same set of channelization codes in a WCDMA system. This creates additional cross-stream interference (in WCDMA systems, this may be referred to as code-reuse interference), which affects the impairment covariance as related to each of the simultaneously transmitted streams.

This cross-stream interference may be accounted for by adding an additional term to the parametric covariance R formulation in Equation (1). For the case of a first data stream (stream 1), the cross-stream interference is due to the second stream (stream 2), thus the impairment covariance matrix is given by:

$$R_{stream1} = R + \alpha_{PC}(2) h_{eff}(b_2) h_{eff}^H(b_2). \tag{19}$$

Similarly, for the case of stream 2, the code-reuse interference is due to stream 1, thus the covariance matrix is given by:

$$R_{stream2} = R + \alpha_{PC}(1) h_{eff}(b_1) h_{eff}^H(b_1). \tag{20}$$

In these expressions, the quantities $\alpha_{PC}(1)$ and $\alpha_{PC}(2)$ are the normalized per-code energies per-symbol allocated to stream 1 and 2, respectively. Letting n index streams, the per-code energy for the $n^{th}$ stream is given by:

$$\alpha_{PC}(n) = \left(\frac{1}{\gamma_p(1)N_p}\right)\left(\frac{N_s}{K}\right)\gamma_d(n)\Gamma_{D/P}, \tag{21}$$

where $N_s$ is the spreading factor used for HS-DSCH (typically 16), and K is the number of spreading codes used for each data stream (same for both streams). The quantity $h_{eff}(b_n)$ is the effective net response vector corresponding to the $n^{th}$ stream and is given by:

$$h_{eff}(b_n) = b_{1n} h_1 + b_{2n} \sqrt{\frac{\gamma_p(1)}{\gamma_p(2)}} h_2. \tag{22}$$

Figure 6:
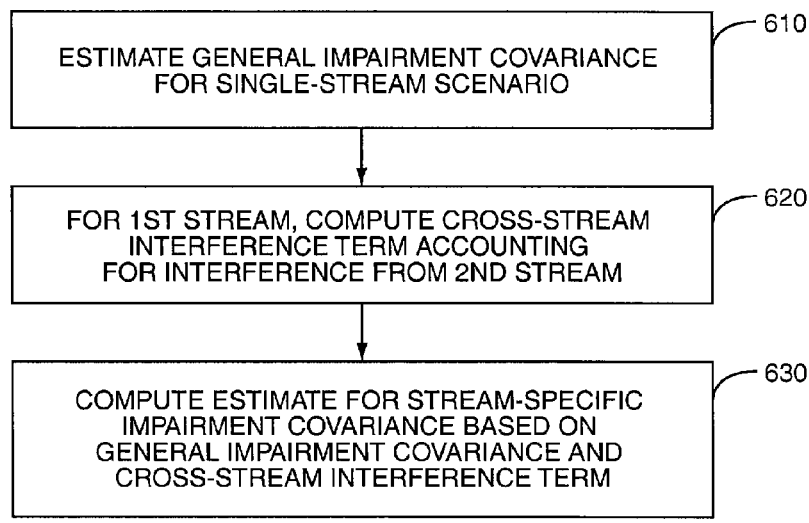
FIG. 6 is a flow diagram of a method of estimating stream-specific impairment covariances for a pre-coded information signal according to one or more embodiments of the present invention.

FIG. 6 illustrates a procedure for obtaining a stream-specific estimate of the impairment covariance in a dual-stream scenario, given the preceding stream-specific model. At block 160, a generalized impairment covariance, such as according to Equation (15) is estimated. This generalized impairment covariance, which may be obtained according to method 500 illustrated in FIG. 5, is directly applicable to the single-stream scenario as described above. At block 610, a term capturing the cross-stream interference to stream 1 caused by stream 2 is computed, based on the per-code energy for stream 2 and the effective net response for stream 2, which in turn depends upon the antenna weighting vector (preceding vector) corresponding to stream 2. Finally, at block 630, a stream-specific impairment covariance estimate is computed, e.g., according to Equation (19).

The stream-specific impairment covariance estimates $\hat{R}_{stream1}$ and $\hat{R}_{stream2}$ may be used, for example, to compute combining weights for detecting the first and second data streams, according to:

$$\hat{R}_{stream1} w_1^{dual} = h_{eff}(b_1)$$

$$\hat{R}_{stream2} w_2^{dual} = h_{eff}(b_2). \tag{23}$$

Similarly, the stream-specific impairment covariance estimates, along with the corresponding effective net channel responses, may be used to compute stream-specific signal-to-interference-plus-noise ratios (SINRs) for each of the data streams, according to well-known techniques. These SINRs may be used, for example, to report channel quality information to the serving base station.

In an alternative approach, stream-specific Minimum-Mean-Squared-Error (MMSE) combining weights may be calculated from an estimated data covariance matrix. The data covariance matrix is computed from the impairment covariance estimate described above and cross-stream interference terms for each of the first and second data streams. Thus:

$$R_d = \hat{R} + \alpha_{PC}(1) h_{\mathit{eff}}(b_1) h_{\mathit{eff}}^H(b_1) + \alpha_{PC}(2) h_{\mathit{eff}}(b_2) h_{\mathit{eff}}^H(b_2). \quad (24)$$

The estimated data covariance matrix may then be used to compute stream-specific combining weights according to:

$$R_d w_1^{dual} = h_{\mathit{eff}}(b_1)$$

$$R_d w_2^{dual} = h_{\mathit{eff}}(b_2). \quad (25)$$

The techniques described above may be adapted slightly to facilitate the estimation of SINR or other channel quality metrics for signal transmission scenarios other than a scenario currently employed, i.e. for a projected transmission scenario. Similarly, the techniques may be used to estimate SINR for projected transmission scenarios even when the mobile station is not scheduled for downlink transmissions at all. For example, $R_{stream1}$ and $R_{stream2}$ as estimated above correspond to a particular active transmission scenario (dual-stream) using a particular set of preceding vectors ($b_1$ and $b_2$). For Channel Quality Indicator (CQI) estimation purposes, the receiver may typically consider a number of transmitter modes that differ from the currently used mode. For instance, the current mode may be one of the four possible dual-stream modes shown in Equation (3); however, the receiver must also prepare a CQI report for one or more of the four possible single-stream modes shown in Equation (2). Such a requirement occurs in Release 7 of the UMTS standard, where the user equipment (UE) is required to periodically prepare single-stream CQI reports (referred to as Type B reports), regardless of what the UE's current or preferred mode is.

In preparing such CQI estimates, the receiver typically forms a parametric estimate of the impairment covariance matrix. Since the scaling parameters $\alpha_1$, $\alpha_2$, $\alpha_{12}^+$, and $\alpha_{12}^-$ defined for the impairment covariance model above are a function of the transmission mode (single- or dual-stream, as well as the particular precoding matrix B employed), it is not accurate to simply use the estimated impairment covariance estimated above. If the mode for which the CQI estimate is being prepared differs from the current mode, then a mismatch would occur.

Figure 7:
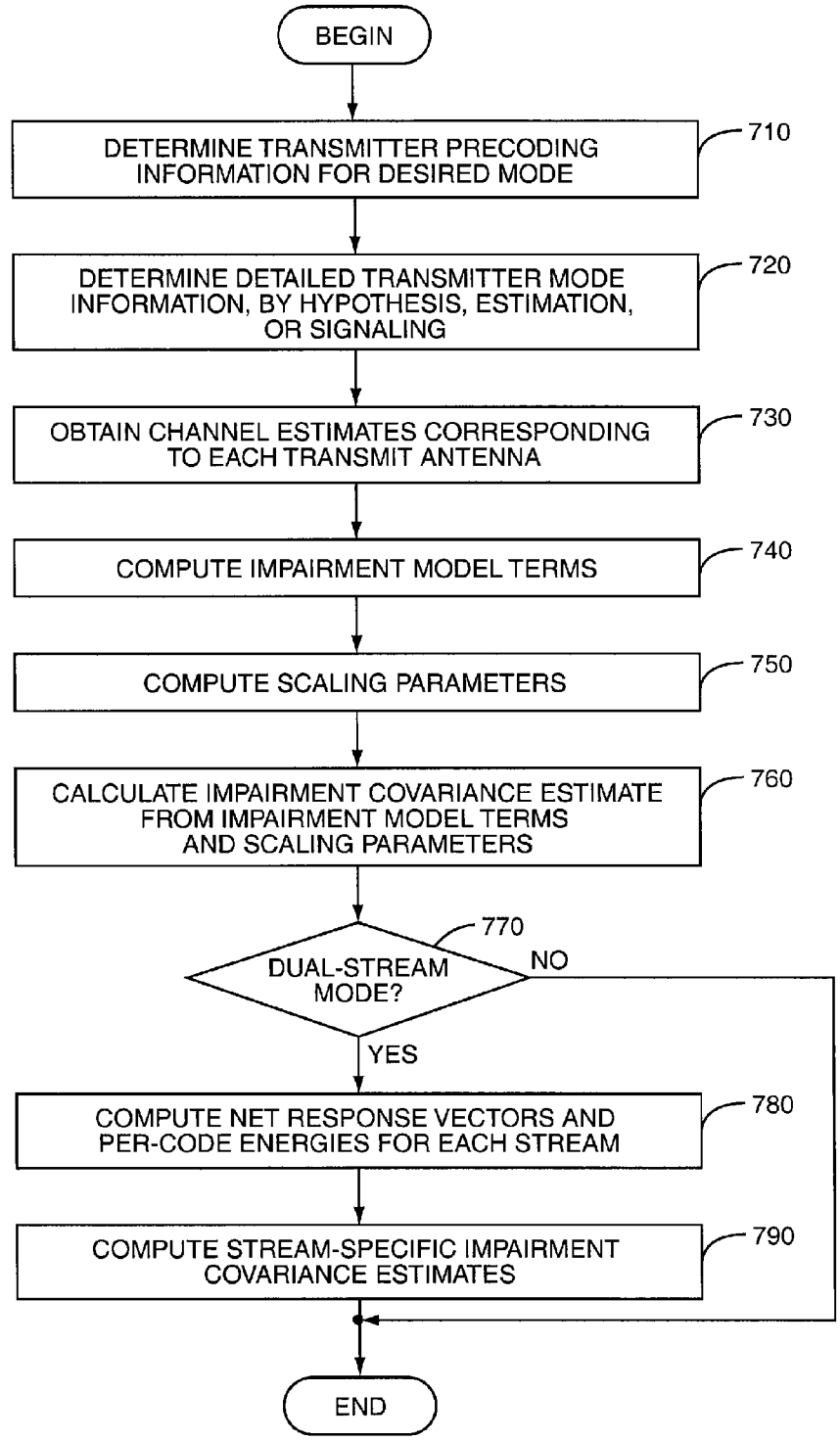
FIG. 7 is a flow diagram of an exemplary method for estimating impairment covariances for use in CQI estimation.

There are several possible approaches to estimating impairment covariance for transmission scenarios other than a currently active scenario. FIG. 7 illustrates a procedure for forming an impairment covariance matrix for an arbitrary desired mode; the resulting impairment covariance matrix may be used according to well-known techniques to produce the corresponding CQI information.

The procedure begins at block 710, with determining the transmitter mode information for the desired mode. This could be obtained, for example, from a look-up table stored in the UE that contains information about all possible transmitter modes. This transmitter mode information specifies, for example, the number of data streams and the precoding matrix (B).

At block 720, additional transmitter mode information is obtained, whether by hypothesis, estimation, use of nominal values, or by explicit higher layer signaling from the base station. This additional transmitter mode information may include: the number of spreading codes (K) employed; as well as the data-to-pilot power ratio ($\Gamma_{D/P}$), voice-to-pilot power ratio ($\Gamma_{V/P}$), and overhead-to-pilot power ratio ($\Gamma_{O/P}$). The additional transmitter mode information may further include the preceding matrix (V) for voice users, and the voice power distribution ($\gamma_v(i)$). This information in particular may not be known to the UE in detail, hence nominal values could be used. In one embodiment, the UE may assume a precoding matrix with all 4 possible entries in the CL-1 codebook, i.e., $V=[u_1\ u_2\ u_3\ u_4]$ and equal power distribution amongst 4 virtual voice users, i.e., $\gamma_v(i)=1/4$ for i=1, 2, 3, 4. Finally, the distribution of data power across streams ($\gamma_s(1)$ and $\gamma_s(2)$), distribution of pilot power across antennas ($\gamma_p(1)$ and $\gamma_p(2)$), and spreading factor for pilot channel ($N_p$) and data channel ($N_s$) must be known, estimated, or hypothesized.

Next, at block 730, channel estimates ($\hat{g}_m$) corresponding to each transmit antenna are obtained. At block 740, these channel estimates are used to compute the impairment model terms $R_{11}$, $R_{22}$, and $R_{12}$, using Equation (9) above, $R_{12}^+$ and $R_{12}^-$, using Equation (11), and $R_N$.

At block 750, values for $\alpha_1$, $\alpha_2$, $\alpha_{12}^+$ and $\alpha_{12}^-$ are calculated using Equation (13) and the information obtained at blocks 710 and 720. A value for $\beta$ may be obtained from some alternate means. For example, a value estimated for $\beta$ based on a previous slot or number of slots (e.g., smoothed value) may be used. Alternatively, if the UE is currently demodulating the HS-DSCH configured in a different mode than the one for which a CQI estimate is being prepared, the same $\beta$ could be used for both demodulation and CQI. This is accurate, since the value of $\beta$ is not mode-specific.

At block 760, a parametric estimate of impairment covariance matrix ($\hat{R}_u$) is computed, using the terms computed at block 740 and the parameters calculated at block 750, using Equation (12). If desired mode is single-stream mode, then estimation of the impairment covariance is complete. Otherwise, as shown at block 770, the process is continued to compute stream-specific impairment covariances.

Accordingly, at block 780, effective net response vectors $h_{\mathit{eff}}(b_n)$ for each stream are computed, as in Equation (22), and per-code energies ($\alpha_{PC}(n)$) corresponding to each stream are computed, as in Equation (21). Finally, at block 790, parametric estimates of impairment covariance for each data stream ($\hat{R}_{stream1}$ and $\hat{R}_{stream2}$) are calculated, using Equations (19) and (20).

In some cases, some of the terms needed to calculate the scaling parameters may be unknown, and might be unsusceptible to ready estimation. For instance, detailed information about the distribution of voice channels across the transmit antennas may be unknown. In some embodiments, then, fitting parameters estimated for the current mode (e.g., according to the method of FIG. 5), may be reused in order to form the impairment covariance matrix corresponding to the potentially different mode(s) for which the UE is preparing a CQI estimate. In these embodiments, antenna weighting vectors corresponding to the projected transmission scenario may be used to compute effective net channel response estimates and/or stream-specific impairment covariance estimates. In some scenarios, this shortcut incurs only a very minor negative impact on performance, while offering a significant reduction in complexity.

In yet another embodiment, if scaling parameters have been fitted for a currently scheduled scenario, then effects of the transmission scenario may be "backed out" of the scaling parameter estimates, and new estimates formed based on a projected transmission scenario. Those skilled in the art will appreciate, upon scrutinizing the scaling parameter expressions in Equation (13) that if the currently used scheduling matrix (B), the overall data-to-pilot code energy ratio ($\Gamma_{D/P}$), the allocation of power between data streams ($\gamma_d$), the allocation of pilot power between the transmit antennas ($\gamma_d$), and the pilot spreading factor ($N_p$) are known for the current scenario, then each scaling parameter may be re-estimated by removing the impact of the current antenna weighting vector and substituting a weighting vector for the projected scenario. If the mobile receiver is currently scheduled for downlink transmissions, then each of these terms is generally known to the mobile receiver or readily estimable using known techniques.

Thus, in some embodiments of a method for estimating SINR for projected transmission scenarios (i.e., scenarios other than a currently scheduled transmission scenario), a mobile receiver may model impairment covariance, according to the invention, and fit the scaling parameters to measured data. The resulting fitting parameters will reflect the actual preceding vector(s). Using an estimated data/pilot energy ratio, and known values for the stream/antenna allocation ratios and the actual preceding vectors, the mobile receiver may then re-calculate new scaling parameters from the fitted parameters, using pre-coding vector(s) for a projected precoding scenario. After computing an estimate of impairment covariance for this projected scenario based on the re-calculated scaling parameters, the mobile receiver may then compute SINR using the new estimate—this will reflect SINR for the projected precoding scenario. This procedure may be repeated as necessary for additional scenarios.

Although described herein in terms of own-cell interference, the present invention may be applied using model terms to model other-cell interference. For example, a single other-cell covariance term per dominant interfering base station may be added to equation (1), as described in the Cairns application. Additionally or alternatively, multiple covariance terms may be added to a count for transmit diversity being used in other cells. Soft handoff may be handled, again as described in the Cairns application. Although described herein in terms of downlink reception, the present invention may be applied in the uplink as well.

Embodiments of the present invention thus provide improved interference suppression for both symbol-level (G-Rake) and chip-level (chip equalizer) LIW receivers, which are the two main architectures for advanced receivers in WCDMA systems. Those skilled in the art will appreciate that the particular design of a LIW receiver in accordance with the inventive techniques, and the associated nomenclature used in connection with such a receiver, may vary according to the network standard involved, but such variations are not germane to understanding or explaining the present invention. Moreover, it should be understood that the networks and radio devices illustrated and discussed herein are simplified; actual implementations likely will have additional entities omitted herein for clarity.

Nevertheless, an exemplary mobile terminal 112 includes one or both of the exemplary receiver circuits 200 or 300, illustrated in FIGS. 2 and 3, respectively. These receiver circuits may be implemented using various processing circuits, including A/D converters, filters, DSPs or other digital processors, memory, and the like. In at least one exemplary embodiment, mobile terminal 112 includes one or more DSPs and/or Application Specific Integrated Circuts (ASICS) or other programmable devices to implement receiver 112 including a G-Rake receiver as illustrated in FIG. 2. The processing circuits may be configured to include processing logic to carry out one or more of the methods described herein. It should thus be understood that at least a portion of the present invention's functionality may be embodied as stored computer instructions in the form of micro-code, firmware, software, etc.

More generally, the present invention can be implemented in hardware or a combination of hardware and software, according to the needs of a particular design. Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method implemented in a wireless receiver of estimating impairment covariance associated with a received composite information signal comprising at least a first data stream transmitted from first and second antennas according to a first antenna weighting vector, the method comprising:
generating first and second propagation channel estimates in the wireless receiver based on the received composite signal;
constructing an impairment model including one or more model terms scaled by corresponding scaling parameters, wherein:
a first impairment model term in the impairment model is a function of the first propagation channel estimates corresponding to the first antenna;
a second impairment model term in the impairment model is a function of the second propagation channel estimates corresponding to the second antenna;
a third impairment model term in the impairment model is a function of both the first and second propagation channel estimates;
each of the first, second, and third impairment model terms are independent of the first antenna weighting vector; and the scaling parameters capture effects of the first antenna weighting vector; and
computing a parametric estimate of the impairment covariance using the impairment model and the generated propagation channel estimates.

2. The method of claim 1, wherein constructing an impairment model further comprises measuring impairment covariance or data covariance associated with the received composite information signal and estimating values for first, second, and third scaling parameters corresponding to the first, second, and third impairment model terms using the measured impairment covariance or data covariance and the computed first, second, and third impairment model terms.

3. The method of claim 2, wherein constructing an impairment model further comprises computing a fourth impairment model term as a function of both the first and second propagation channel estimates and a fifth impairment model term corresponding to noise, and estimating values for first, second, third, fourth, and fifth scaling parameters corresponding to the first, second, third, fourth, and fifth impairment model terms using the measured impairment covariance or data covariance and the computed first, second, third, fourth, and fifth impairment model terms.

4. The method of claim 1, further comprising calculating processing weights as a function of the parametric estimate of the impairment covariance and propagation channel estimates corresponding to the first and second antennas.

5. The method of claim 4, wherein the processing weights comprise combining weights for use in a symbol-level equalizer.

6. A method implemented in a wireless receiver of estimating impairment covariance associated with a received composite information signal comprising at least a first data stream transmitted from first and second antennas according to a first antenna weighting vector, the method comprising:
  generating propagation channel estimates in the wireless receiver based on the received composite information signal;
  constructing an impairment model including one or more model terms scaled by corresponding scaling parameters, wherein the model terms capture propagation channel effects and are independent of the first antenna weighting vector, and wherein the scaling parameters capture effects of the first antenna weighting vector;
  computing a parametric estimate of the impairment covariance using the impairment model; and
  calculating processing weights as a function of the parametric estimate of the impairment covariance and the propagation channel estimates corresponding to the first and second antennas, wherein the processing weights comprise filter weights for use in a chip-level equalizer.

7. A method of estimating impairment covariance associated with a received composite information signal comprising at least a first data stream transmitted from first and second antennas according to a first antenna weighting vector, the method being implemented in a wireless receiver and comprising:
  generating propagation channel estimates based on the received composite information signal;
  constructing an impairment model including one or more model terms scaled by corresponding scaling parameters, wherein the model terms capture propagation channel effects and are independent of the first antenna weighting vector, and wherein the scaling parameters capture effects of the first antenna weighting vector;
  computing a parametric estimate of the impairment covariance using the impairment model and the generated propagation channel estimates; and
  calculating a signal-to-interference-plus-noise ratio (SINR) estimate as a function of the parametric estimate of the impairment covariance.

8. A method implemented in a wireless receiver of estimating impairment covariance associated with a received composite information signal comprising at least a first data stream transmitted from first and second antennas according to a first antenna weighting vector, the method comprising:
  measuring propagation channel estimates in the wireless receiver based on the received composite information signal;
  constructing an impairment model including one or more model terms scaled by corresponding scaling parameters, wherein the model terms capture propagation channel effects and are independent of the first antenna weighting vector, and wherein the scaling parameters capture effects of the first antenna weighting vector;
  computing a parametric estimate of the impairment covariance using the impairment model and the measured propagation channel estimates; and
  calculating a projected impairment covariance estimate based on at least a second antenna weighting vector corresponding to a projected transmitted signal configuration.

9. The method of claim 8, wherein calculating a projected impairment covariance estimate comprises revising the scaling parameters based on the second antenna weighting vector and calculating the projected impairment covariance estimate based on the revised scaling parameters.

10. A method implemented in a wireless receiver of estimating impairment covariance associated with a received composite information signal comprising at least a first data stream transmitted from first and second antennas according to a first antenna weighting vector, the method comprising:
  measuring propagation channel estimates in the wireless receiver based on the received composite information signal;
  constructing an impairment model including one or more model terms scaled by corresponding scaling parameters, wherein the model terms capture propagation channel effects and are independent of the first antenna weighting vector, and wherein the scaling parameters capture effects of the first antenna weighting vector;
  computing a parametric estimate of the impairment covariance using the impairment model and the measured propagation channel estimates; and
wherein the composite information signal comprises a second data stream transmitted from both the primary and secondary transmit antennas according to a second antenna weighting vector;
  wherein constructing an impairment model comprises constructing a cross-stream interference term corresponding to the second data stream as a function of the second antenna weighting vector and propagation channel estimates corresponding to the first and second antennas; and
  wherein computing a parametric estimate of the impairment covariance comprises computing a stream-specific estimate of the impairment covariance for the first data stream based on the impairment model and the cross-stream interference term corresponding to the second data stream.

11. The method of claim 10, further comprising calculating stream-specific combining weights as a function of the stream-specific estimate of the impairment covariance, for use in symbol-level equalization and detection of the first data stream.

12. The method of claim 10, further comprising calculating a stream-specific signal-to-interference-plus-noise ratio (SINR) as a function of the stream-specific estimate of the impairment covariance.

13. A method implemented in a wireless receiver of estimating impairment covariance associated with a received composite information signal comprising at least a first data stream transmitted from first and second antennas according to a first antenna weighting vector, the method comprising:
  measuring propagation channel estimates in the wireless receiver based on the received composite information signal;
  constructing an impairment model including one or more model terms scaled by corresponding scaling parameters, wherein the model terms capture propagation channel effects and are independent of the first antenna weighting vector, and wherein the scaling parameters capture effects of the first antenna weighting vector;
  computing a parametric estimate of the impairment covariance using the impairment model and the measured propagation channel estimates; and
wherein the composite information signal comprises a second data stream transmitted from both the primary and secondary transmit antennas according to a second antenna weighting vector, and wherein the constructed impairment model omits any cross-stream interference terms, the method further comprising:
   computing a data covariance estimate as a function of the computed parametric estimate of the impairment covariance, a first cross-stream interference term corresponding to the first data stream, and a second cross-stream interference corresponding to the second data stream; and
   calculating stream-specific combining weights for the first data stream as a function of the data covariance estimate and an effective net channel response corresponding to the first data stream.

14. A wireless communication receiver, comprising:
   a radio front-end circuit configured to receive a composite information signal, the composite information signal comprising at least a first data stream transmitted from first and second transmit antennas according to a first antenna weighting vector; and
   one or more processing circuits configured to:
      construct an impairment model including one or more model terms scaled by corresponding scaling parameters, wherein the model terms capture propagation channel effects and are independent of the first antenna weighting vector, and wherein the scaling parameters capture effects of the first antenna weighting vector; and
      compute a parametric estimate of an impairment covariance using the impairment model;
   wherein the one or more processing circuits are configured to construct an impairment model by computing a first impairment model term as a function of first propagation channel estimates corresponding to the first antenna, a second impairment model term as a function of second propagation channel estimates corresponding to the second antenna, and a third impairment model term as a function of both the first and second propagation channel estimates, wherein each of the first, second, and third impairment model terms are independent of the first antenna weighting vector.

15. The wireless communication receiver of claim 14, wherein the one or more processing circuits are further configured to construct an impairment model by measuring impairment covariance or data covariance associated with the received composite information signal and estimating first values for first, second, and third scaling parameters corresponding to the first, second, and third impairment model terms using the measured impairment covariance or data covariance and the computed first, second, and third impairment model terms.

16. The wireless communication receiver of claim 14, wherein the one or more processing circuits are further configured to calculate processing weights as a function of the parametric estimate of the impairment covariance and propagation channel estimates corresponding to the first and second antennas.

17. The wireless communication receiver of claim 16, wherein the one or more processing circuits comprise a symbol-level equalizer, and wherein the processing weights comprise combining weights for use in the symbol-level equalizer.

18. A wireless communication receiver, comprising:
   a radio front-end circuit configured to receive a composite information signal, the composite information signal comprising at least a first data stream transmitted from first and second transmit antennas according to a first antenna weighting vector; and
   one or more processing circuits configured to:
      construct an impairment model including one or more model terms scaled by corresponding scaling parameters, wherein the model terms capture propagation channel effects and are independent of the first antenna weighting vector, and wherein the scaling parameters capture effects of the first antenna weighting vector;
      compute a parametric estimate of an impairment covariance using the impairment model; and
      calculate a signal-to-interference-plus-noise ratio (SINR) estimate as a function of the parametric estimate of the impairment covariance.

19. A wireless communication receiver, comprising:
   a radio front-end circuit configured to receive a composite information signal, the composite information signal comprising at least a first data stream transmitted from first and second transmit antennas according to a first antenna weighting vector; and
   one or more processing circuits configured to:
      construct an impairment model including one or more model terms scaled by corresponding scaling parameters, wherein the model terms capture propagation channel effects and are independent of the first antenna weighting vector, and wherein the scaling parameters capture effects of the first antenna weighting vector;
      compute a parametric estimate of an impairment covariance using the impairment model; and
      calculate a projected impairment covariance estimate based on at least a second antenna weighting vector corresponding to a projected transmitted signal configuration.

20. The wireless communication receiver of claim 19, wherein the one or more processing circuits are configured to calculate the projected impairment covariance estimate by revising the scaling parameters based on the second antenna weighting vector and calculating the projected impairment covariance estimate based on the revised scaling parameters.

21. A wireless communication receiver, comprising:
   a radio front-end circuit configured to receive a composite information signal, the composite information signal comprising at least a first data stream transmitted from first and second transmit antennas according to a first antenna weighting vector; and
   one or more processing circuits configured to:
      construct an impairment model including one or more model terms scaled by corresponding scaling parameters, wherein the model terms capture propagation channel effects and are independent of the first antenna weighting vector, and wherein the scaling parameters capture effects of the first antenna weighting vector; and
      compute a parametric estimate of an impairment covariance using the impairment model;
   wherein the composite information signal comprises a second data stream transmitted from both the primary and secondary transmit antennas according to a second antenna weighting vector, and wherein the one or more processing circuits are configured to:
      construct the impairment model by constructing a cross-stream interference term corresponding to the second data stream as a function of the second antenna weighting vector and propagation channel estimates corresponding to the first and second antennas; and
      compute the parametric estimate of the impairment covariance by computing a stream-specific estimate of the impairment covariance for the first data stream based on the impairment model and the cross-stream interference term corresponding to the second data stream.

22. The wireless communication receiver of claim 21, further comprising a symbol-level equalizer, wherein the one or more processing circuits are further configured to calculate stream-specific combining weights as a function of the stream-specific estimate of the impairment covariance, for use in symbol-level equalization and detection of the first data stream.

23. A wireless communication receiver, comprising:
a radio front-end circuit configured to receive a composite information signal, the composite information signal comprising at least a first data stream transmitted from first and second transmit antennas according to a first antenna weighting vector; and
one or more processing circuits configured to:
construct an impairment model including one or more model terms scaled by corresponding scaling parameters, wherein the model terms capture propagation channel effects and are independent of the first antenna weighting vector, and wherein the scaling parameters capture effects of the first antenna weighting vector; and
compute a parametric estimate of an impairment covariance using the impairment model;
wherein the composite information signal comprises a second data stream transmitted from both the primary and secondary transmit antennas according to a second antenna weighting vector, and wherein the constructed impairment model omits any cross-stream interference terms, and wherein the one or more processing circuits are further configured to:
compute a data covariance estimate as a function of the computed parametric estimate of the impairment covariance, a first cross-stream interference term corresponding to the first data stream, and a second cross-stream interference corresponding to the second data stream; and
calculate stream-specific combining weights for the first data stream as a function of the data covariance estimate and an effective net channel response corresponding to the first data stream.

* * * * *

UNITED STATES PATENT AND TRADEMARK OFFICE
CERTIFICATE OF CORRECTION

PATENT NO. : 8,781,011 B2
APPLICATION NO. : 12/036323
DATED : July 15, 2014
INVENTOR(S) : Grant Page 1 of 2

It is certified that error appears in the above-identified patent and that said Letters Patent is hereby corrected as shown below:

In the Specification

In Column 1, Line 51, delete "preceding" and insert -- precoding --, therefor.

In Column 1, Line 53, delete "preceding" and insert -- precoding --, therefor.

In Column 2, Line 33, delete "preceding" and insert -- precoding --, therefor.

In Column 2, Line 38, delete "preceding" and insert -- precoding --, therefor.

In Column 2, Line 48, delete "preceding" and insert -- precoding --, therefor.

In Column 2, Line 51, delete "preceding" and insert -- precoding --, therefor.

In Column 5, Line 44, delete "(preceding" and insert -- (precoding --, therefor.

In Column 6, Line 41, delete "preceding" and insert -- precoding --, therefor.

In Column 6, Line 45, delete "preceding" and insert -- precoding --, therefor.

In Column 6, Lines 46-47, delete "preceding" and insert -- precoding --, therefor.

In Column 6, Line 65, delete "preceding" and insert -- precoding --, therefor.

In Column 7, Line 17, delete "preceding" and insert -- precoding --, therefor.

In Column 7, Line 18, delete "preceding" and insert -- precoding --, therefor.

In Column 7, Line 36, delete "preceding" and insert -- precoding --, therefor.

In Column 7, Line 58, delete "preceding" and insert -- precoding --, therefor.

In Column 8, Line 58, delete "$R_2^H$" and insert -- $R_{12}^H$ --, therefor.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,781,011 B2

In Column 8, Line 65, delete "preceding" and insert -- precoding --, therefor.

In Column 8, Line 67, delete "preceding" and insert -- precoding --, therefor.

In Column 9, Line 6, delete "preceding" and insert -- precoding --, therefor.

In Column 9, Line 62, delete "preceding" and insert -- precoding --, therefor.

In Column 9, Line 65, delete "preceding" and insert -- precoding --, therefor.

In Column 9, Line 67, delete "preceding" and insert -- precoding --, therefor.

In Column 10, Line 11, delete "preceding" and insert -- precoding --, therefor.

In Column 11, Line 43, delete "preceding" and insert -- precoding --, therefor.

In Column 12, Line 55, delete "(preceding" and insert -- (precoding --, therefor.

In Column 13, Line 32, delete "preceding" and insert -- precoding --, therefor.

In Column 14, Line 9, delete "preceding" and insert -- precoding --, therefor.

In Column 15, Line 21, delete "preceding" and insert -- precoding --, therefor.

In Column 15, Line 23, delete "preceding" and insert -- precoding --, therefor.